(12) United States Patent
Valdes Esquivel et al.

(10) Patent No.: US 11,334,420 B2
(45) Date of Patent: May 17, 2022

(54) REMOTE RECOVERY AND SUPPORT USING CHAT MESSAGES

(71) Applicant: Microsoft Technology Licensing, LLC, Redmond, WA (US)

(72) Inventors: Zyanya Valdes Esquivel, Redmond, WA (US); Shakeel Solkar, Sammamish, WA (US); Scott A. Moody, Bothell, WA (US); Diana Slaba, Redmond, WA (US); Jonathan H. Mollerup, Woodinville, WA (US); Luis Delgado, Redmond, WA (US); Yuedong Yin, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 510 days.

(21) Appl. No.: 16/426,426

(22) Filed: May 30, 2019

(65) Prior Publication Data

US 2020/0379838 A1    Dec. 3, 2020

(51) Int. Cl.
*G06F 11/07* (2006.01)

(52) U.S. Cl.
CPC ...... *G06F 11/0793* (2013.01); *G06F 11/0709* (2013.01); *G06F 11/0769* (2013.01)

(58) Field of Classification Search
CPC ............. G06F 11/0709; G06F 11/0751; G06F 11/0769; G06F 11/079; G06F 11/0793
USPC .............................................. 714/15, 46, 57
See application file for complete search history.

(56) References Cited

U.S. PATENT DOCUMENTS

| 6,170,065 | B1 | 1/2001 | Kobata et al. |
| 7,257,514 | B2 | 8/2007 | Faihe |
| 8,762,862 | B2 | 6/2014 | Singh et al. |
| 9,529,635 | B2 | 12/2016 | Werth et al. |
| 10,379,929 | B2* | 8/2019 | Eckstein ............. G06F 11/0775 |
| 10,606,687 | B2* | 3/2020 | Purushothaman ........ G06F 8/30 |
| 10,733,037 | B2* | 8/2020 | Ramakrishna ...... G06F 11/0793 |
| 2014/0279718 | A1 | 9/2014 | Southey et al. |
| 2016/0134568 | A1 | 5/2016 | Woo |
| 2018/0203755 | A1* | 7/2018 | Das ....................... G06F 11/079 |

OTHER PUBLICATIONS

Gupte, Rateek, "Introducing Feedback Bot: Customer Experience Powered by Conversational AI", Retrieved From: https://haptik.ai/blog/launching-feedback-bot-conversational-ai-engine/, Apr. 10, 2019, 12 Pages.

"Application Filed in U.S. Appl. No. 16/218,940", filed Dec. 13, 2018, 22 Pages.

* cited by examiner

*Primary Examiner* — Joseph R Kudirka
(74) *Attorney, Agent, or Firm* — Christopher J. Volkmann; Kelly, Holt & Christenson, PLLC

(57) ABSTRACT

A client computing system receives a chat message with an action identifier. The chat message is parsed to identify executable recovery code on the client computing system. The executable recovery code is represented in a chat message interface on the client computing system, along with an authorization actuator. Actuation of the authorization actuator is detected and the recovery code is executed on the client computing system.

20 Claims, 14 Drawing Sheets

REMOTE RECOVERY AND SUPPORT USING CHAT MESSAGES

BACKGROUND

Computer systems are currently in wide use. Some computer systems host services that can be accessed and used by client computing systems. Other computing systems run applications and other programs locally. Still other computer systems both use services that are hosted remotely, and run local applications.

Many computing systems are also configured to communicate over a network, such as a wide area network. This communication can take many forms. Some such computer systems have on-line chat functionality. This type of functionality offers a way in which users of computing systems can communicate with one another, in a near real time way, using text messages that are transmitted over the internet or other wide area network.

In some computing system architectures, support agents (such as engineers or other technicians) can communicate with remote users, in an attempt to fix problems that the remote users are having on their computing systems. By way of example, many computing systems enable "help" functionality. A user can invoke the help functionality in many ways, such as by actuating a user actuatable input mechanism on the user's display screen. This can enable a wide array of different levels of assistance or support (sometimes referred to as different levels of deflection).

By way of example, one level of support may allow the user to search a repository for answers to a problem that the user is having. The user may be able to input a number of keywords (a search query) into a search box, and a search engine searches a support repository and returns articles or other items of information that are related to the problem described by the user in the search query.

Another level of support may allow the user to communicate with a remote support agent (such as a remote engineer) using electronic communication, such as e-mail, or other communication. Similarly, another level of support may provide contact information so that the user can directly call a support agent, or engage that support agent in a video conference.

Some systems allow the support agent computing system to implement chat functionality so that a support agent can communicate, with a client user, using the chat functionality in the support agent computing system and the client computing system.

The discussion above is merely provided for general background information and is not intended to be used as an aid in determining the scope of the claimed subject matter.

SUMMARY

A client computing system receives a chat message with an action identifier. The chat message is parsed to identify executable recovery code on the client computing system. The executable recovery code is represented in a chat message interface on the client computing system, along with an authorization actuator. Actuation of the authorization actuator is detected and the recovery code is executed on the client computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
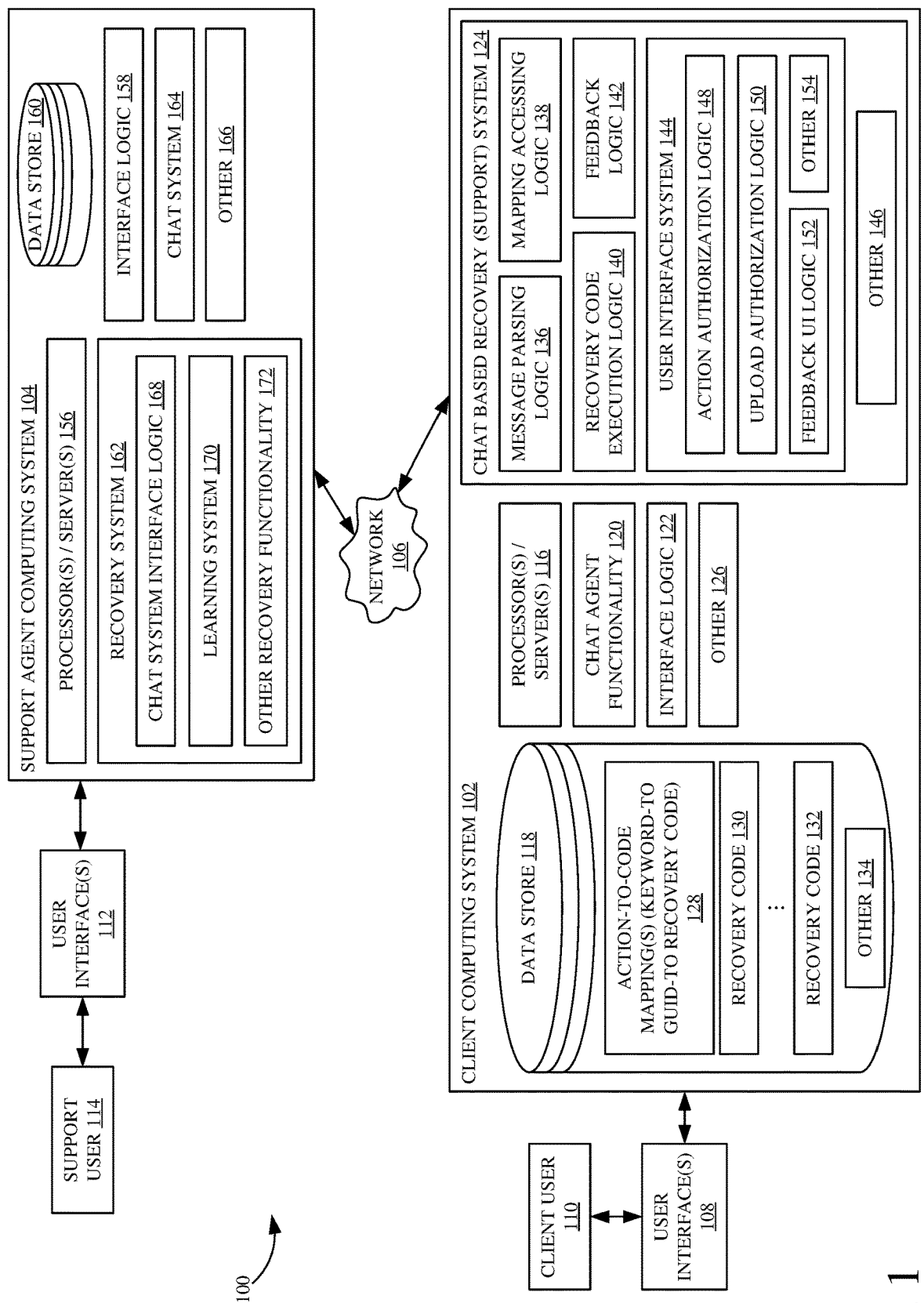
FIG. 1 is a block diagram of one example of a computing system architecture.

FIG. 1 is a block diagram of one example of a computing system architecture 100. Architecture 100 shows a client computing system 102 that can interact with a support agent computing system 104 over network 106. Network 106 can thus be any of a wide variety of different types of networks, such as a wide area network, a local area network, a near field communication network, a cellular communication network, or any of a wide variety of other networks or combinations of networks.

In one example, client computing system 102 illustratively generates user interfaces 108 for interaction by a client user 110. Client user 110 illustratively interacts with user interfaces 108 in order to control and manipulate client computing system 102, and to communicate with other systems, such as support agent computing system 104. Similarly, support agent computing system 104 illustratively generates user interfaces 112 for interaction by a support user 114. Support user 114 illustratively interacts with user interfaces 112 in order to control and manipulate support agent computing system 104 and some items on client computing system 102.

In one example, client computing system 102 may be running an application that client user 110 is using to perform some function or operation. The application may have a problem or it may malfunction in some way. Similarly, problems can be caused by configuration of client computing system 102, by settings in client computing system 102, or for a wide variety of other reasons. When a problem occurs, client user 110 can illustratively interact with one or more user actuatable elements on user interface 108 in order to communicate to support agent computing system 104 that client computing system 102 is encountering a problem. This may be an initial step in attempting to solve the problem, or it may occur after other levels of deflection.

For instance, it may be that, in order to solve the problem, client user 110 interacts with user interfaces 108 in order to access help content on client computing system 102 or help content that has been downloaded from another system. The help content may allow client user 110 to search a data store of potential fixes for the problem. It may also be that client user 110 performs other actions in an attempt to fix the problem, before initiating communication with support agent computing system 104. However, at some point, it is assumed that client user 110 operates client computing system 102 in order to communicate with support agent computing system 104, to let the support agent computing system 104 know that client computing system 102 is encountering a problem.

In one example, the information provided by client computing system 102 describing the problem can be surfaced for support user 114 on user interfaces 112. Support user 114 can then generate communications with client computing system 102 in an attempt to address the problem. In some current systems, this involves support user 114 providing relatively lengthy and detailed instructions, over network 106, to client user 110, instructing client user 110 to perform relatively lengthy and complicated operations. This is done in an attempt by support user 114 to obtain information about client computing system 102, that will help support user 114 address the problem. It is also done in an attempt to, once the problem is identified by support user 114, help client user 110 take recovery actions to eliminate the problem, or otherwise mitigate or address the problem. This can be cumbersome and is error-prone, often requiring multiple attempts to perform the desired operations.

Thus, the present description proceeds with respect to a system that allows support user 114 to send an action identifier to client computing system 102 in a chat message. The action identifier identifies an action to be taken on client computing system 102 and the action can be described and displayed to client user 110 for authorization. When client user 110 authorizes the action, the action identifier triggers executable code that is stored on client computing system 102, and that can be run in an attempt to eliminate, mitigate or otherwise address the problem that client computing system 102 is encountering. The system also allows client user 110 to provide feedback, through a chat message, so that the information can be used to increase the effectiveness of support agent computing system 104 in addressing future problems.

Thus, in one example, client computing system 102 illustratively includes one or more processors or servers 116, data store 118, chat agent functionality 120, interface logic 122, chat-based recovery (or support) system 124, and it can include a wide variety of other items 126. Data store 118 can include action-to-code mappings 128, a plurality of different sets of recovery code 130-132, and it can include other items 134. Chat-based recovery system 124 can include message parsing logic 136, mapping accessing logic 138, recovery code execution logic 140, feedback logic 142, a user interface system 144, and it can include other items 146. User interface system 144, itself, can include action authorization logic 148, upload authorization logic 150, feedback user interface (UI) logic 152, and it can include other items 154.

Support agent computing system 104 illustratively includes one or more processors or servers 156, interface logic 158, data store 160, recovery system 162, chat system 164, and it can include a wide variety of other items 166. Recovery system 162, itself, illustratively includes chat system interface logic 168, learning system 170, and it can include a wide variety of other recovery functionality 172 as well.

Before describing the overall operation of architecture 100 in performing recovery or support actions using chat messages, a brief description of some of the items in architecture 100, and their operation, will first be described.

Chat agent functionality 120, in client computing system 102, illustratively includes logic and functionality that can be implemented by the processors or servers 116 to enable client computing system 102 to engage in on-line chat messaging with other, remote computing systems, such as support agent computing system 104. Therefore, it includes the components and logic that are used in surfacing a dialog box and user input mechanisms that can be used by client user 110 to generate and respond to chat messages.

Interface logic 122 illustratively generates user interfaces 108 and detects user interactions with them. It can provide an indication of those user interactions to other items in client computing system 102 and/or remote systems over network 106.

Action-to-code mappings 128, in data store 118, illustratively include one or more mappings between action indicators, that can be received in a chat message at client computing system 102, from support agent computing system 104, to executable code that can be run, when actuated. In one example, the action identifier identifies that the chat message has a corresponding action and it includes a specific action indicator, such as a keyword or other text string, that identifies the specific action to be performed. That keyword or text string is illustratively mapped to a GUID which is, itself, mapped to the executable code that can be run on client computing system 102, when actuated. It will be noted that the action indicator (e.g., the keyword or text string) can be directly mapped to the executable recovery code as well, and it need not be mapped through a GUID. These are just two examples of mapping the action indicator to executable recovery code.

The items of recovery code 130-132 include code that the mappings 128 identify in response to receiving the action identifier. The items of recovery code 130-132 can be executed by processors or servers 116, when they are actuated. As discussed above, in one example, a chat message with the action identifier can be sent from support agent computing system 104 to client computing system 102, and displayed to client user 110 on user interfaces 108, along with an actuator. When user 110 actuates the actuator, then the code that is mapped to the action indicator can be executed. The items of recovery code 130-132 can be any types of recovery code that a support user 114 wishes to run on client computing system 102, in order to address a problem or issue with client computing system 102. The items of recovery code 103-132 can be extendable so that additional items of recovery code can be intermittently downloaded onto client computing system 102 from support agent computing system 104, or from a different location.

Chat-based recovery (support) system 124 illustratively includes functionality that can be used by (or that can use) chat agent functionality 120 and interface logic 122, in order to accomplish recovery actions (or support actions) using chat messages. It will be noted that some items in chat-based recovery (support) system 124 can be in the chat agent functionality 120 as well. They are shown separately for the sake of example only.

Message parsing logic 136 illustratively parses chat messages to determine whether the sender (e.g., support agent computing system 104) has sent an action identifier that identifies recovery code that is to be run. Mapping accessing logic 138 illustratively accesses the mappings 128 in data store 118, when an action identifier has been sent in the chat message, and identified by message parsing logic 136. It accesses mappings 128 to identify the particular item of recovery code 130-132 that is to be executed, given the specific action indicator received in the chat message.

Recovery code execution logic 140 illustratively configures and executes the identified item of recovery code 130-132. It can obtain results of that execution and prepare them to be uploaded to support agent computing system 104. It can execute the recovery code in other ways as well.

Feedback logic 142 illustratively uses interface logic 122 to generate a chat interface that allows client user 110 to provide feedback indicative of the efficacy of the action that was just undertaken, to address the issue or problem that was reported. One example of this is described in more detail below with respect to FIGS. 7A and 7B.

Interface system 144 can generate a number of different items on a user interface. Action authorization logic 148 illustratively generates an authorization user input mechanism that can be actuated by client user 110 in order to authorize recovery code execution logic 140 to execute the identified recovery code, that was identified based upon the action identifier received. Upload authorization logic 150 illustratively generates a user interface mechanism that can be actuated by client user 110 to authorize recovery code execution logic 140 to upload the results of the recovery code, once it is run, or to upload any other information to support agent computing system 104. When the user actuates that user input mechanism, this indicates that client user 110 has authorized the upload operation.

Feedback UI logic 152 illustratively generates user actuatable input mechanisms that can be displayed on chat messages, to client user 110, and that allow client user 110 to provide feedback. The user interaction with those mechanisms can be detected by interface logic 122 and provided to feedback logic 142. Logic 142 can generate an indication of the user's feedback and prepare it for transmission to support agent computing system 104. When authorization is received by client user 110 (such as by actuating a user actuatable display element), feedback logic 142 can provide the user feedback to support agent computing system 104.

In support agent computing system 104, interface logic 158 illustratively generates user interfaces 112 and detects user interaction with those interfaces. It can provide an indication of those interactions to other items in computing system 104, or to remote systems. Chat system 164 illustratively includes the functionality that allows support agent computing system 104 to allow support user 114 to engage in online chat messaging with users of remote computing systems (such as client user 110). Thus, it illustratively includes the functionality that can be used to generate a dialog box and chat interfaces that can be displayed on user interfaces 112, for interaction by support user 114 to generate and send online chat messages.

Recovery system 162 illustratively includes functionality that allows support user 114 to perform any of a wide variety of support actions in order to support users of remote computing systems (such as user 110 of client computing system 102). Therefore, it may allow different forms of communication with client computing systems. It may provide user support 114 with access to information that can be used to identify problems and solutions to problems, and it can include other items as well.

Chat system interface logic 168 illustratively allows recovery system 162 to use chat system 164 to perform recovery actions on client computing system 102. Therefore, for instance, it allows support user 114 to send chat messages which include an action identifier, and to obtain results of recovery actions performed on client computing system 102, from chat messages received by chat system 164. It can also illustratively obtain the results or other information uploaded from client computing system 102, in other ways as well.

Learning system 170 illustratively receives the feedback from client user 110, indicating the efficacy of actions that were identified by support user 114, and sent to client computing system 102 in a chat message. Once those actions are performed and client user 110 provides feedback indicating the efficacy of those actions, learning system 170 can incorporate those actions into other recovery functionality 172. For instance, if a particular action is efficacious in mitigating a problem under certain circumstances, then when another user reports that problem, under similar circumstances, the mitigating action can be surfaced for support user 114 using recovery functionality 172 earlier than when no feedback had yet been received. Learning system 170 can be a machine learning system that prioritizes different actions under different circumstances, or in different scenarios, where they have previously been found to be efficacious. Similarly, it may surface those actions in earlier deflections, for client user 110 (or other users), when that problem next surfaces for a client.

Figure 2A:
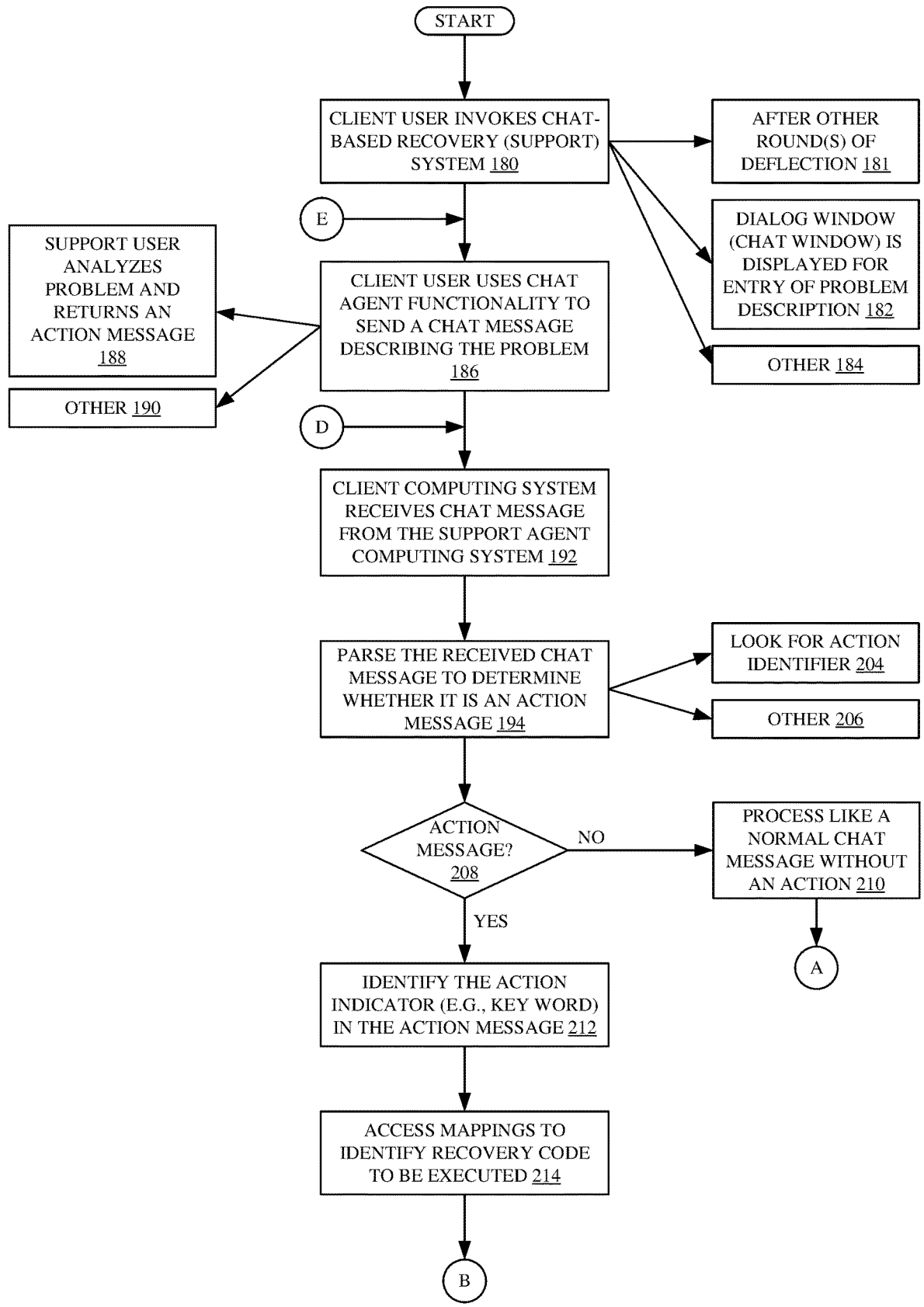
FIGS. 2A-2C (collectively referred to herein as FIG. 2) show a flow diagram illustrating one example of the architecture shown in FIG. 1.
Figure 2B:
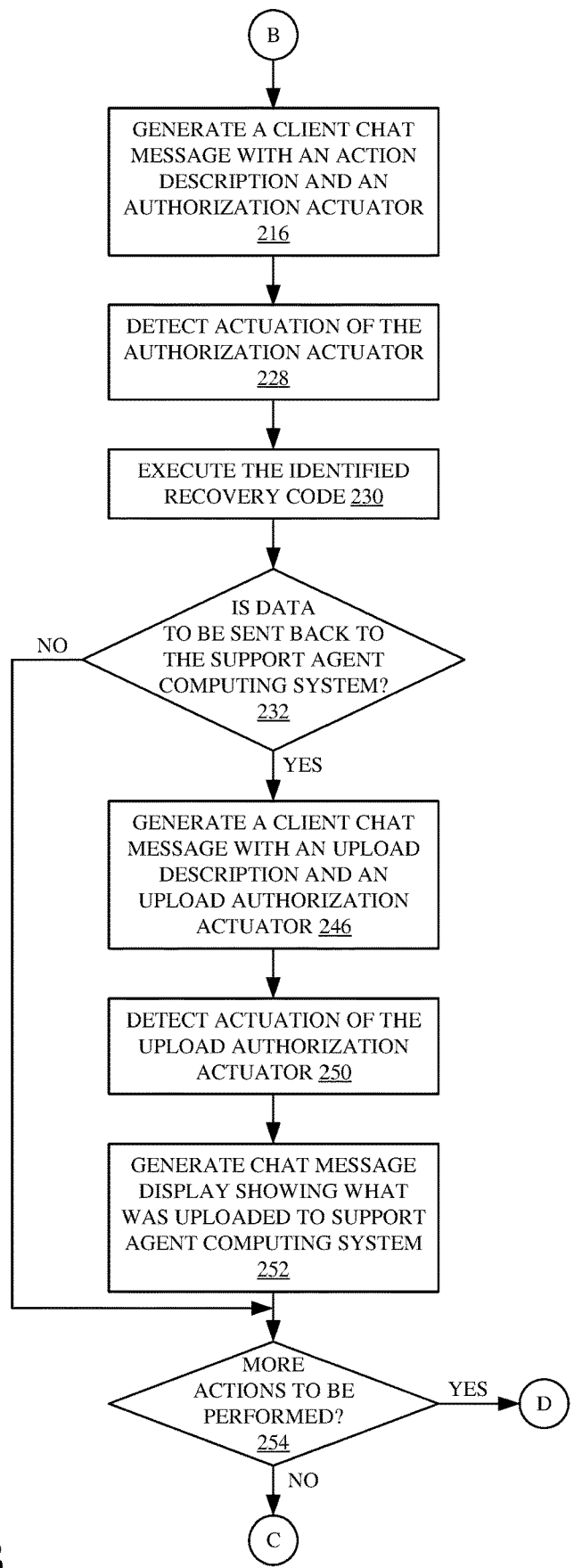
Figure 2C:
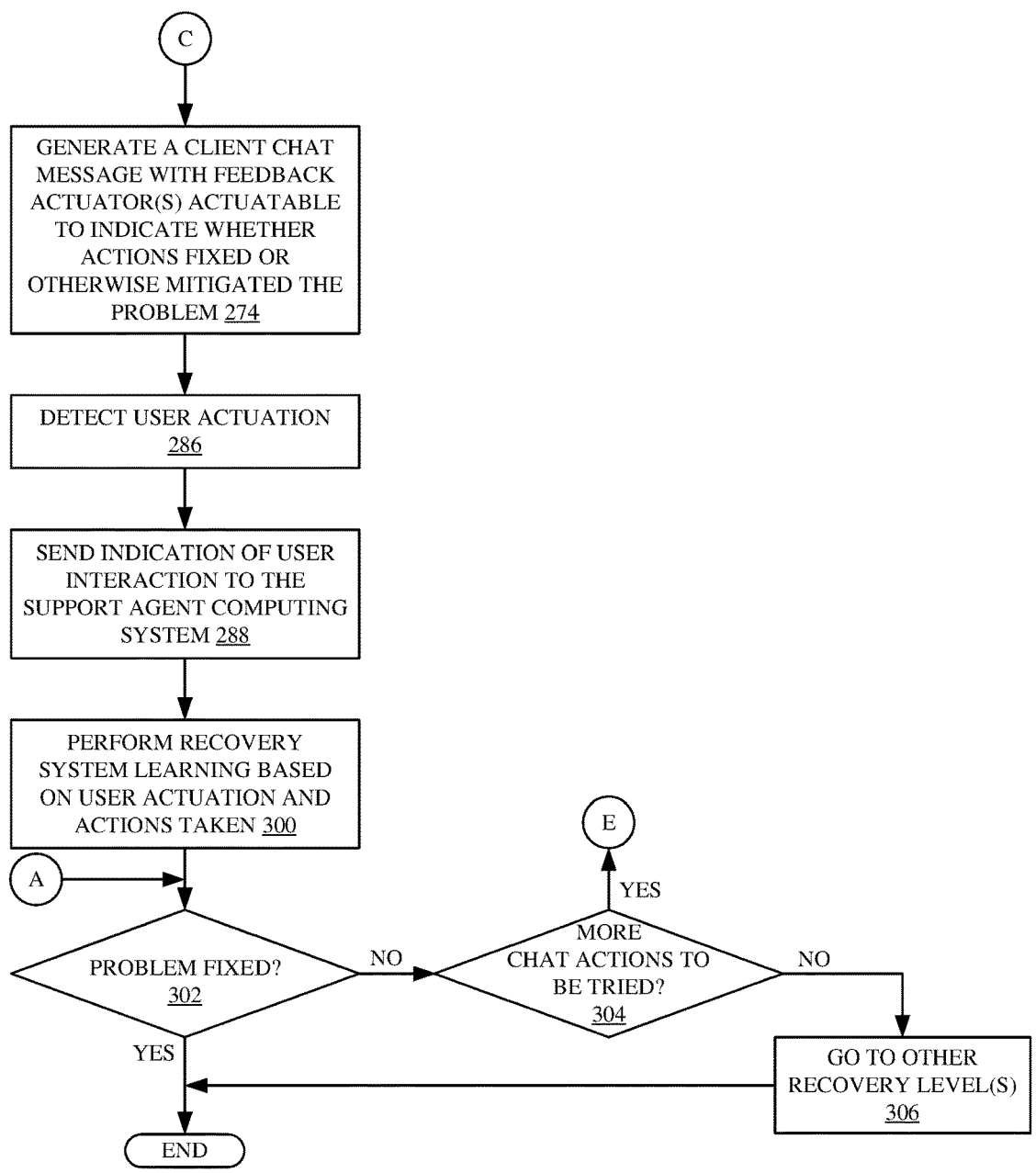

FIGS. 2A-2C (collectively referred to herein as FIG. 2) illustrate a flow diagram showing one example of the operation of architecture 100, in executing recovery code by using chat messages. It is first assumed that client user 110 is experiencing a problem or issue with client computing system 102. In that case, client user 110 may invoke the chat-based recover (support) system 124. This is indicated by block 180 in the flow diagram of FIG. 2. This can be done, for instance, by client user 110 actuating a user input mechanism on one of user interfaces 108 in order to invoke system 124. This can also be done after other rounds of deflection have already been traversed by client user 110. This is indicated by block 181.

Once the client user 110 has invoked chat-based recovery system 124, then a dialog window (or chat window) is illustratively displayed for entry of a problem description, on user interface 108. This can be done using chat agent functionality 120, or other items. Displaying the dialog window for entry of the problem description is indicated by block 182. The client user 110 can invoke chat-based recovery (support) system 124 in a wide variety of other ways as well, and this is indicated by block 184.

Client user 110 then illustratively provides a description of the problem (such as by typing into a text box on a chat window). Client user 110 then illustratively actuates a "send" user input mechanism and chat agent functionality 120 sends the chat message (describing the problem) to support agent computing system 104. This is indicated by block 186 in the flow diagram of FIG. 2. In one example, the chat message is displayed on user interfaces 112, by chat system 164, to support user 114. Support user 114 can then analyze the problem and identify an action that is to be performed on client computing system 102 in an attempt to mitigate the problem. The action may be, for instance, to gather more information from client computing system 102, to have client computing system 102 run a recovery action, to record user 110 recreating the problem on client computing system 102, so that it can be reviewed by support user 114, or a wide variety of other items.

Once support user 114 identifies an action to be taken, support user 114 returns an action identifier in a chat message, to client computing system 102, using chat system 164 and chat system interface logic 168 in recovery system 162. Sending the action identifier, in a chat message, to client computing system 102, is indicated by block 188 in the flow diagram of FIG. 2. Sending a description of the problem to support agent computing system 104 and receiving an action identifier in a chat message can be done in other ways as well, and this is indicated by block 190 in FIG. 2.

The chat agent functionality 120 in client computing system 102 receives the chat message with the action identifier, from the support agent computing system 104. This is indicated by block 192 in FIG. 2. In doing so, it can display the chat message, with the action identifier, in a dialog window on user interfaces 108, to client user 110.

Figures 3A, 3B:
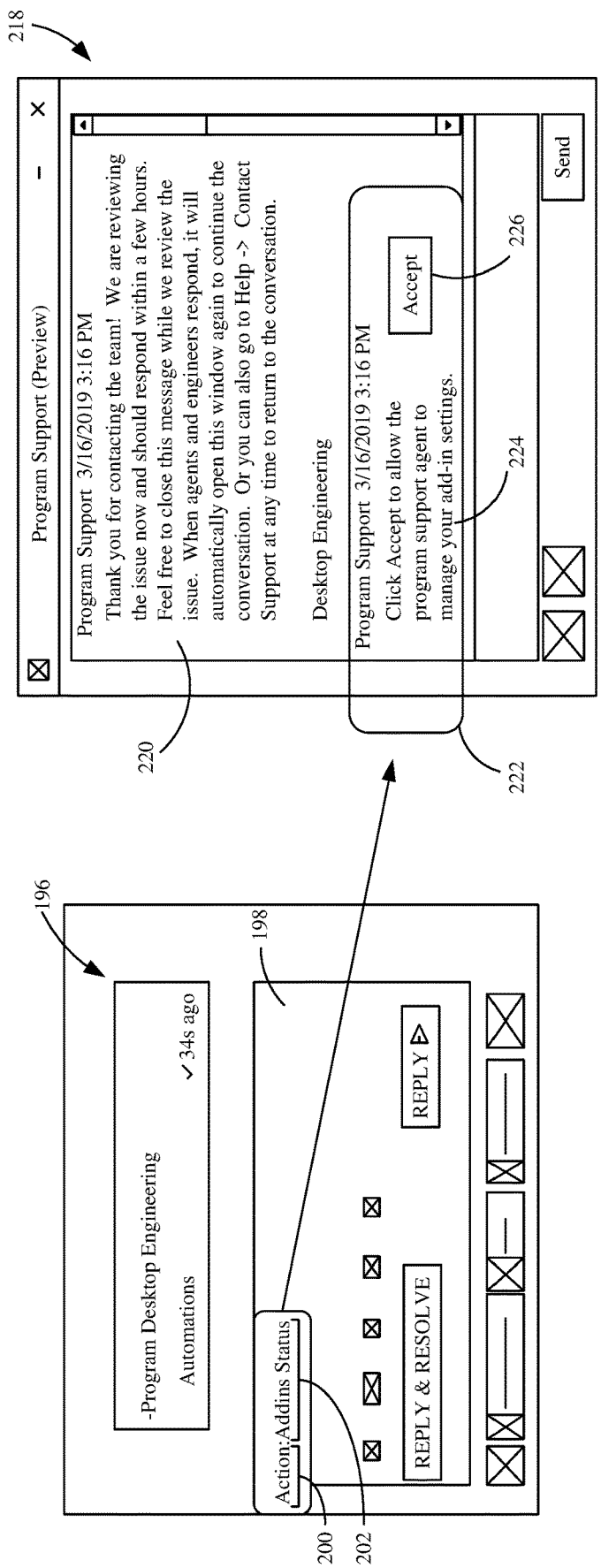
FIGS. 3A, 3B, 4A, 4B, 5A, 5B, 6A, 6B, 7A and 7B are examples of user interface displays that can be displayed on a support agent computing system display mechanism and a client computing system display mechanism.

Message parsing logic 136 then parses the chat message received from support agent computing system 104 to determine whether it is, indeed an action message which includes an action identifier. This is indicated by block 194 in the flow diagram of FIG. 2. In one example, the text string entered by support user 114 into the chat message may include an action identifier which indicates that the text following the action identifier is a specific action indicator that indicates a particular action that is to be taken. FIGS. 3A and 3B show one example of this.

FIG. 3A shows one example of a user interface display 196 that can be displayed for support user 114, during the chat experience. It is assumed that client user 110 has already sent a message describing the problem to support user 114. It is also assumed that support user 114 has analyzed the information he or she has and identified an action to be taken. For instance, in the example shown in FIG. 3A, support user 114 has identified that the add-in settings on client computing system 102 should be checked. Therefore, an action to be taken on client computing system 102 is to obtain the add-in settings from client computing system 102 and return them to support agent computing system 104, for review by support user 114. Thus, support user 114 illustratively types an action identifier, followed by a specific action indicator, in a chat message and sends it to client computing system 102. Chat system 164 illustratively surfaces the dialog box in display 196 and allows support user 114 to type into the text entry mechanism 198. It can be seen that support user 114 has first typed an action identifier 200 indicating that the following text 202 will be a specific action indicator. In the example, the word "Action" is the action identifier indicating that the chat message is an action message which contains a specific action indicator that identifies a particular item of recovery code 130-132 that is to be executed. Thus, when client computing system 102 receives the chat message containing the action identifier 200 and specific action indicator 202, message parsing logic 136 parses the logic to identify those two items. Looking for the action identifier 200 is indicated by block 204 in the flow diagram of FIG. 2. Parsing the received message to determine whether it is an action message can be done in other ways as well, and this is indicated by block 206. Once message parsing logic 136 identifies the action identifier 200, indicating that an action is going to be indicated by the following text, then it obtains the action indicator 202 from the chat message. In the example shown in FIG. 3A, the action indicator 202 is a keyword or set of keywords "Add-ins Status".

If, at block 208, message parsing logic 136 does not find the action identifier 200, this means that the chat message is not an action message and is thus processed like any other normal chat message that is received, and that is not an action message. This is indicated by block 210. For instance, it may be that the text in the chat message is simply displayed in a dialog box to client user 110. This is just one example.

However, if, at block 208, it is determined by message parsing logic 136 that the chat message is an action message (because the action identifier "Action" was identified in the message), then message parsing logic 236 identifies the specific action indicator 202 (which in the example shown in FIG. 3A is a keyword). Identifying the action identifier in the action message is indicated by block 212 in the flow diagram of FIG. 2. As discussed above, it is the specific action indicator 202 which is mapped to a set of recovery code 130-132 that is to be executed on client computing system 102, once it is actuated.

Thus, mapping accessing logic 138 uses the keyword (specific action indicator 202) to access mappings 128 which map that keyword to a set of recovery code 130-132. Accessing the mappings to identify the recovery code to be executed is indicated by block 214 in the flow diagram of FIG. 2. When the recovery code (assume for the sake of example that recovery code 132 is mapped to the specific action indicator 202 "Add-ins Status"), then user interface system 144 generates a client chat message with an action description portion and an authorization actuator. This is indicated by block 216 in the flow diagram of FIG. 2. One example of this is shown in FIG. 3B.

FIG. 3B shows a user interface display 218 that can be generated for client user 110. It illustratively includes a dialog box with a set of messages. The first message 220 was generated after client user 110 invoked the chat-based recovery system 124 and sent a chat message to support user 114 describing the problem. Message 120 indicates that support user 114 is analyzing the problem.

Then, when support user 114 sent back the message shown in FIG. 3A, and after mapping accessing logic 138 identified the particular recovery code 130 that is to be executed based upon the action message received, then user interface system 144 generated the message 222 shown in FIG. 3B. That message includes an action description portion 224 that describes the action that is to be taken. Action authorization logic 148 also generates an authorization actuator 226 that can be actuated by client user 110 in order to authorize recovery code 130 to be run or executed.

In the example shown in FIG. 3B, recovery code 130 is code that acquires information indicative of the "Add-in Settings" on client computing system 102 and prepares that information to be sent back to support agent computing system 104, where it can be analyzed by support user 114. Thus, action authorization logic 148 detects user actuation of actuator 226 and provides an indication of this (such as an authorization signal) to recovery code execution logic 140. Detecting actuation of the authorization actuator 226 is indicated by block 228 in the flow diagram of FIG. 2. In response, recovery code execution logic 140 determines that it is authorized to execute recovery code 130 to obtain the add-in settings on client computing system 102, and generate information indicative of those settings so that it can be sent back to support user 114 in a chat message. Executing the identified recovery code is indicated by block 230 in the flow diagram of FIG. 2.

It may be that not all actions generate information that is to be sent back to the support user 114. Instead, it may be that support user 114 sends an action message in which code is executed to simply fix a problem on client computing system 102, but no data is returned. However, with respect to the current example, the add-in settings are to be returned to support agent computing system 104. Determining whether there is any data to be sent back to the support agent computing system is performed by recovery code execution logic 140 and is indicated by block 232 in the flow diagram of FIG. 2.

Figures 4A, 4B:
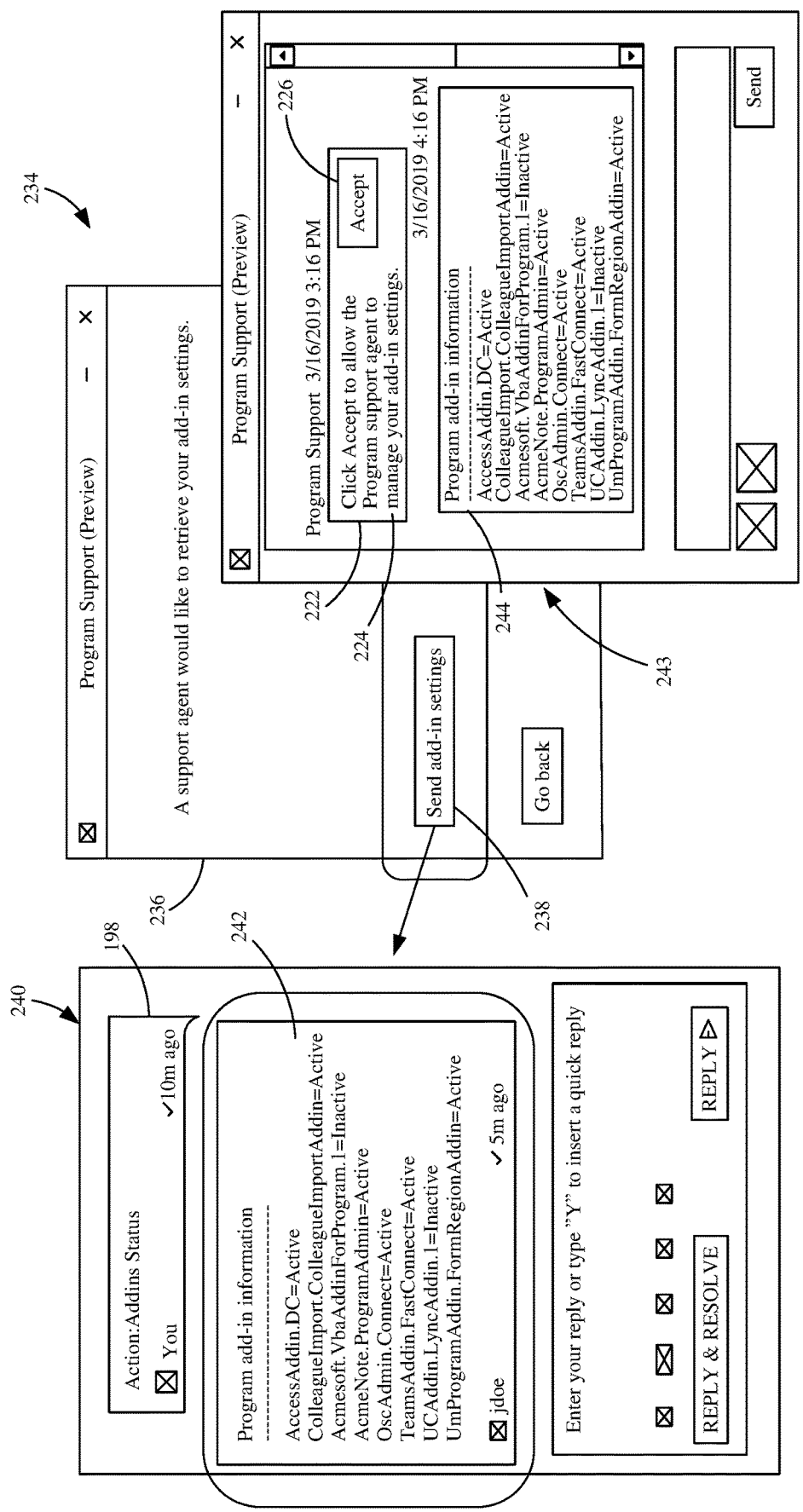

If so, then recovery code execution logic 140 uses interface logic 122 to generate a chat message display such as display 234, shown in FIG. 4B. Display 234 includes a first screen 236 that indicates that information is to be retrieved by, or sent back to, support agent computing system 104. Upload authorization logic 150 (in client computing system 102) also generates an authorization actuator 238 on display 236, that can be actuated by client user 110 in order to authorize client computing system 102 to return the add-in settings information to support agent computing system 104. Thus, in the present example, information is not simply sent from client computing system 102 to support agent computing system 104, without user authorization. That may be the case in other examples, but in the present example, authorization is sought first.

Once client user 110 actuates actuator 238, then the settings data is transmitted back to support agent computing system 104, in a chat message, and displayed to support user 114 in a chat message display such as display 240 shown in FIG. 4A. Display 240 includes a chat message portion 243 that shows the add-in information generated by client-based recovery system 124 and sent back to support agent computing system 104 (and particularly chat system 164) in a chat message.

FIG. 4B also shows that the chat user interface display shown to client user 110 is also updated by user interface system 144 to show a display such as display 243 shown in FIG. 4B. Display 243 now includes a chat message 244 that displays the same information that is displayed to support user 114 in chat message display portion 242 (shown in FIG. 4A).

Generating the client chat message 236, with an upload description and upload authorization actuator 238, is indicated by block 246 in the flow diagram of FIG. 2. Detecting user actuation of the upload authorization actuator 238 is indicated by block 250. Generating the chat display 243, showing the information in chat message 244 that was uploaded to support agent computing system 104, is indicated by block 252 in the flow diagram of FIG. 2.

It may be that no further actions are to be performed, and the problem has already been mitigated by the actions performed to this point. However, it may also be that additional actions are to be performed in order to mitigate the problem. Making this determination may be done automatically by system 124, based on the code that was executed (or based on other criteria) or by user 114 or in other ways, and is indicated by block 254 in the flow diagram of FIG. 2. If more actions are to be performed, then processing reverts to block 192 where support user 114 generates another action message, it is sent to chat-based recovery system 124 where it is parsed to identify the code to be executed and, once actuated (such as by actuating an authorization actuator), that code is executed on client computing system 102.

Figures 5A, 5B:
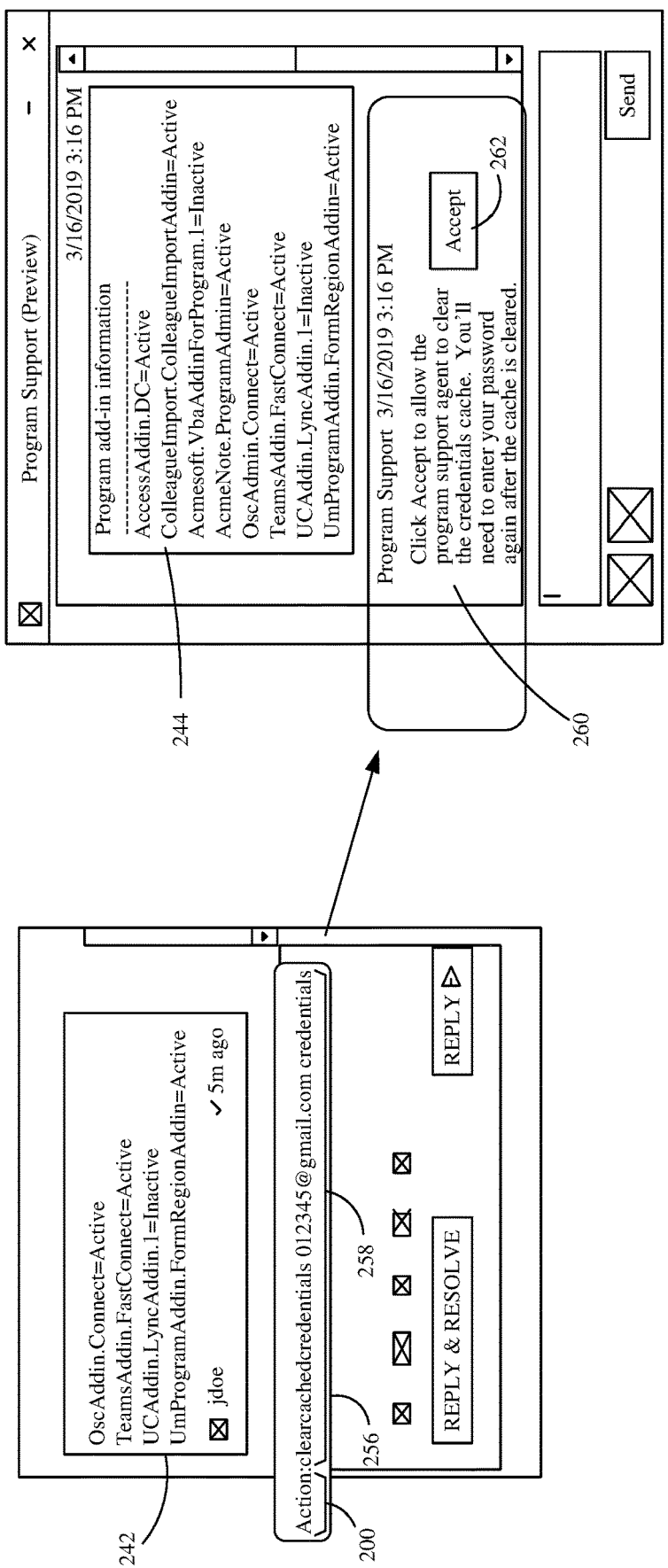

In the example being considered, for instance, it can be seen in FIG. 5A that the support user 114 has generated another action message 256. It includes the same action identifier 200, to indicate that the chat message is an action message. However, it includes a different specific action indicator 258, which is mapped to a different set of executable recovery code 130-132 on client computing system 102. Thus, once that code is identified by mapping accessing logic 138, another chat message 260 is generated for client user 110 describing the action that is to be taken, and generating an authorization actuator 262. In the example shown in FIG. 5A, the action is to fix the customer credential problem.

Figures 6A, 6B:
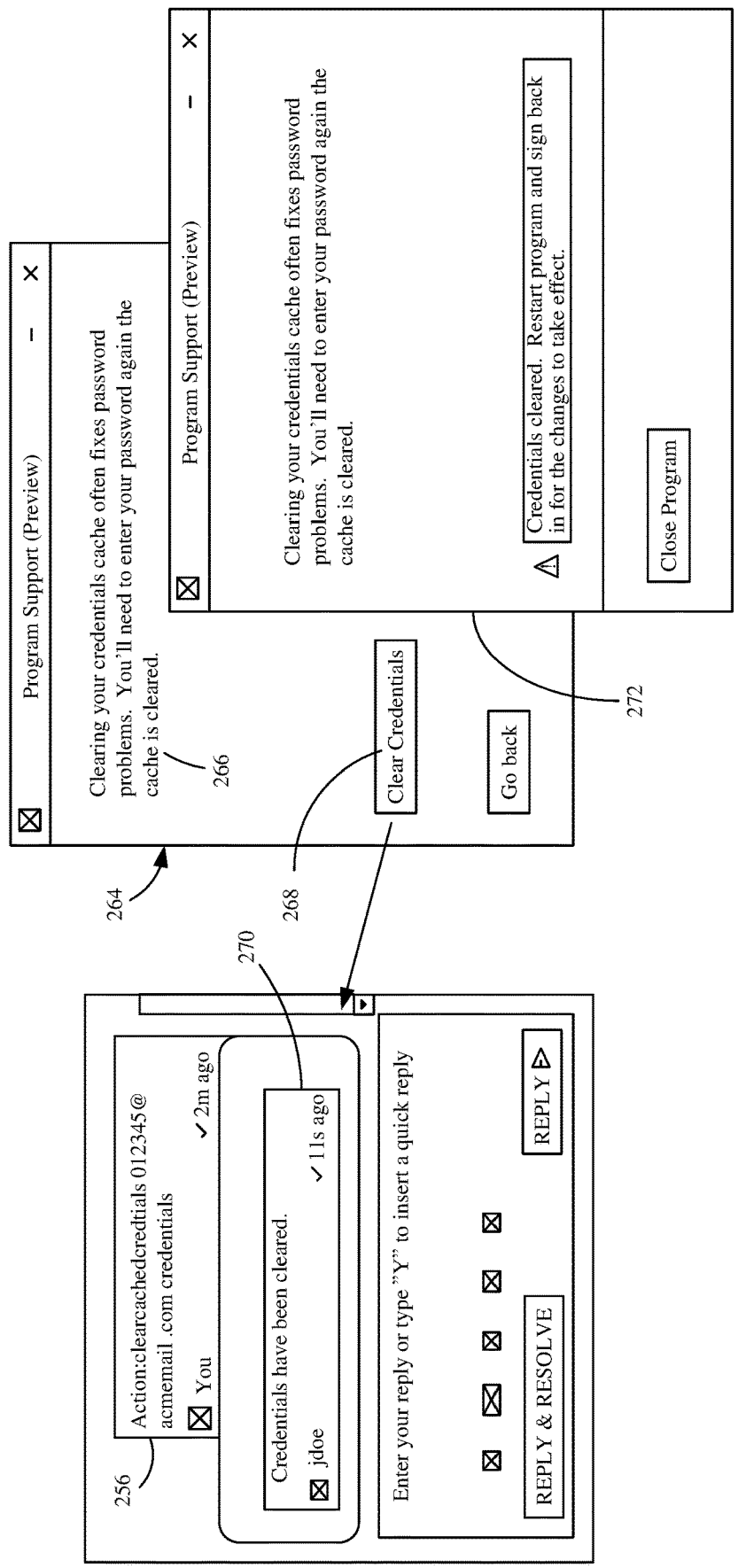

Thus, when the client user 110 actuates actuator 262, then the recovery code (e.g., recovery code 132 which clears the client credentials) is executed. In another example, another level of authorization can be performed. For instance, as shown in FIG. 6B, another user interface display 264 can be displayed, with a description portion 266 that describes the action, and with another authorization actuator 268. When the user actuates actuator 268, an indication that the action has been performed (e.g., that the user credentials have been cleared) can be generated by recovery code execution logic 140 and transmitted back to support agent computing system 104 as a chat message. For instance, FIG. 6A shows that a chat message 270 is generated on support agent computing system 104 for display to support user 114. Similarly, the executed code can generate another user interface display 272 for client user 110, as a chat message. It can include instructions for further actions to take, among other things.

If, at block 254, it is determined that there are no more actions to be taken, then feedback logic 142 controls feedback UI logic 152 to generate a client chat message with feedback actuators that are actuatable to indicate whether the actions fixed the problem. This is indicated by block 274 in the flow diagram of FIG. 2.

For instance, after recovery code execution logic 140 has executed the recovery code, and it is the last recovery code to be executed at this time, this is indicated to feedback logic 142. Feedback logic 142 then controls feedback UI logic 152 in user interface system 144 to generate a user interface display, as a chat message, for client user 110, which allows client user 110 to provide feedback. One example of this is shown in FIG. 7B.

Figures 7A, 7B:
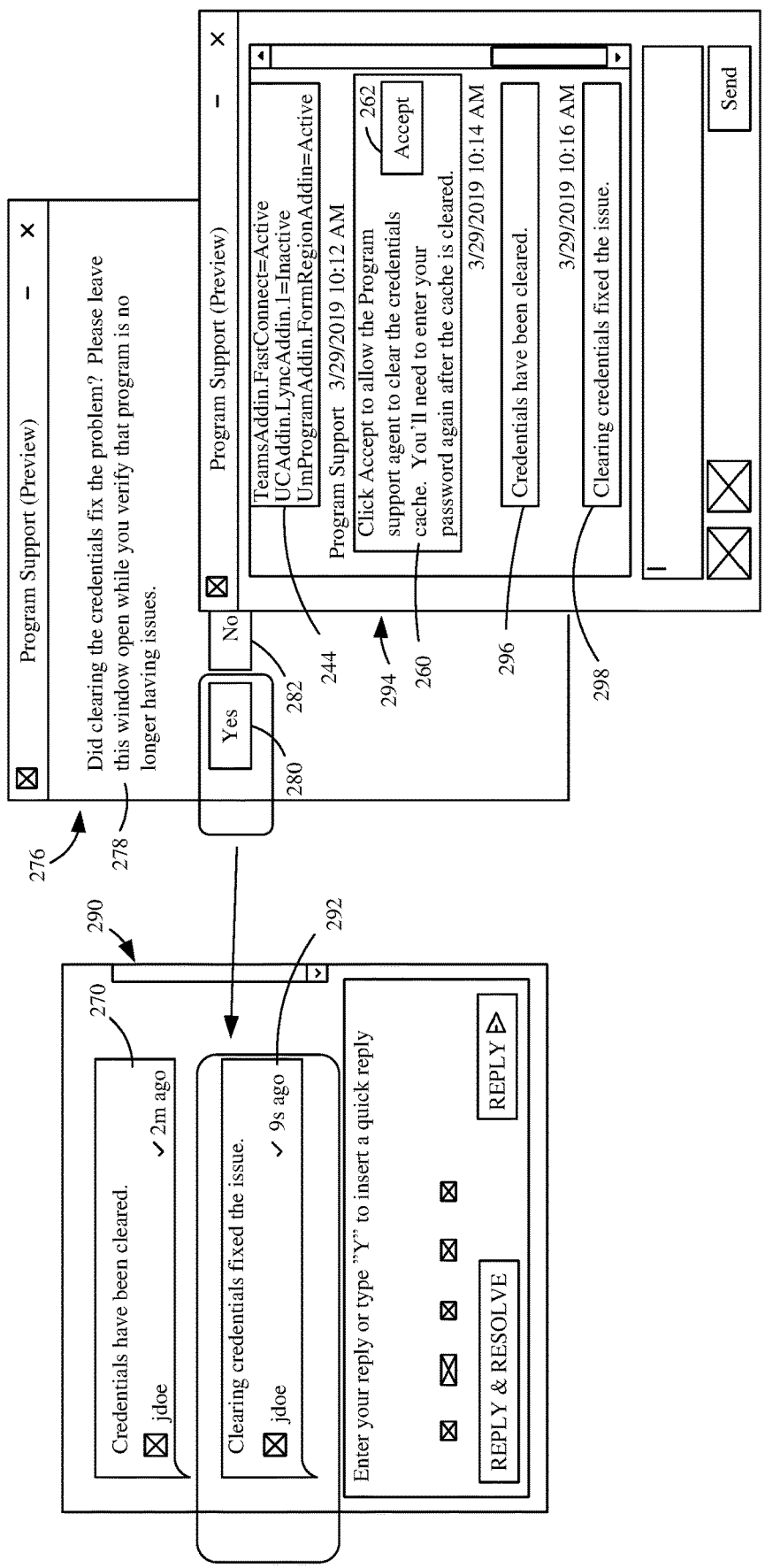

FIG. 7B shows that feedback logic 142, controls user interface system 144 to generate and display a chat message, such as chat message 276. It can be seen that chat message 276 contains a textual portion 278 which inquires as to whether the executed recovery code addressed the problem or issue reported by the user. It then gives a set of actuators 280 and 282, which can be actuated by client user 110, in order to indicate whether the recovery code was successful in mitigating the issue.

Interface logic 122 then detects user interaction with one of the actuators 280-282 and provides an indication of that to feedback UI logic 152. An indication of the detected user interaction is then returned to recovery system 162, in support agent computing system 104, by client-based recovery system 124. Detecting user interaction with one of the actuators is indicated by block 286 in the flow diagram of FIG. 2, and sending an indication of that user interaction to support agent computing system 104 is indicated by block 288. Chat system interface 168 can then control chat system 164 to generate a chat message as a user interface 112 for support user 114. The chat message may include a message that shows the user's feedback.

FIG. 7A shows one example of this. The chat message display 290 now includes a message 292 which indicates to support user 114 how client user 110 interacted with actuators 280-282. Similarly, chat-based recovery system 124 can control interface logic 122 to generate a chat message display, such as display 294, shown in FIG. 7B. It can be seen that display 294 now includes a chat message 296 showing that the recovery code has been executed, and a chat message 298, showing the feedback that the client user 110 just provided regarding the efficacy of that recovery code.

On support agent computing system 104, recovery system 162 may keep track of the problems identified by client computing system 102, and the various items of recovery code 130-132 that have been executed in an attempt to mitigate the problems. It also illustratively monitors the user feedback indicating whether the items of recovery code were successful in mitigating the problem. This information is illustratively provided to learning system 170. Learning system 170 can be a machine learning system, a neural network or classifier, an item of artificial intelligence, or another system that uses the feedback information to enhance recovery system logic that may be used by support agent computing system 104 and/or support user 114, in identifying a recovery code that will be used to mitigate different issues. If the user feedback indicates that the recovery code just executed was successful in mitigating the issue, then this recovery code may be weighted higher as an action for potentially mitigating this issue, or otherwise provided earlier in the troubleshooting process. Similarly, if it was not successful, then it may be weighted lower as a potential mechanism for mitigating this particular issue or problem, under the current circumstances. Learning system 170 can thus use the information to improve the recovery (support) process overall. Performing recovery system learning based on the user feedback is indicated by block 300 in the flow diagram of FIG. 2.

If the problem is fixed, as indicated by block 302, then the recovery process has ended. If not, and more chat actions are to be tried, as indicated by block 304, then processing reverts to block 186 where client user 110 may provide additional information describing the problem to support agent computing system 104 so that support user 114 can suggest further actions, in action messages, using the chat functionality. If no more actions are to be tried, using the chat system, then support may proceed to other levels, such as telephone interaction between support user 114 and client user 110, etc. Proceeding to other levels of recovery is indicated by block 306 in the flow diagram of FIG. 2.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
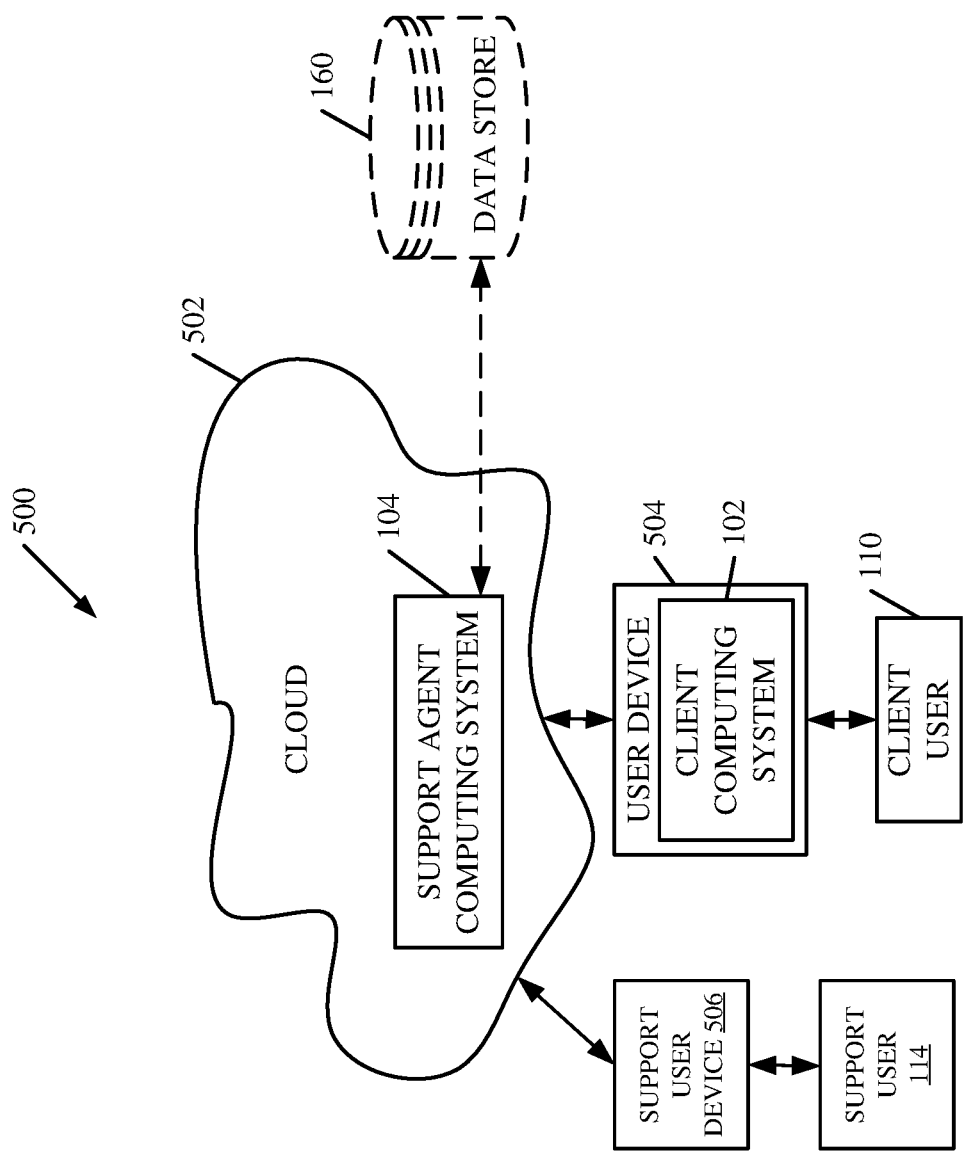
FIG. 8 is a block diagram showing one example of the architecture shown in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that support agent computing system 102 can be located in cloud 502 (which can be public, private, or a combination where portions are public while others are private). It can be accessed by support user 114 using a support user device 506. Client user 100 uses a user device 504 to access those systems through cloud 502.

FIG. 8 also depicts another example of a cloud architecture. FIG. 8 shows that it is also contemplated that some elements of architecture 100 can be disposed in cloud 502 while others are not. By way of example, data store 160 can be disposed outside of cloud 502, and accessed through cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
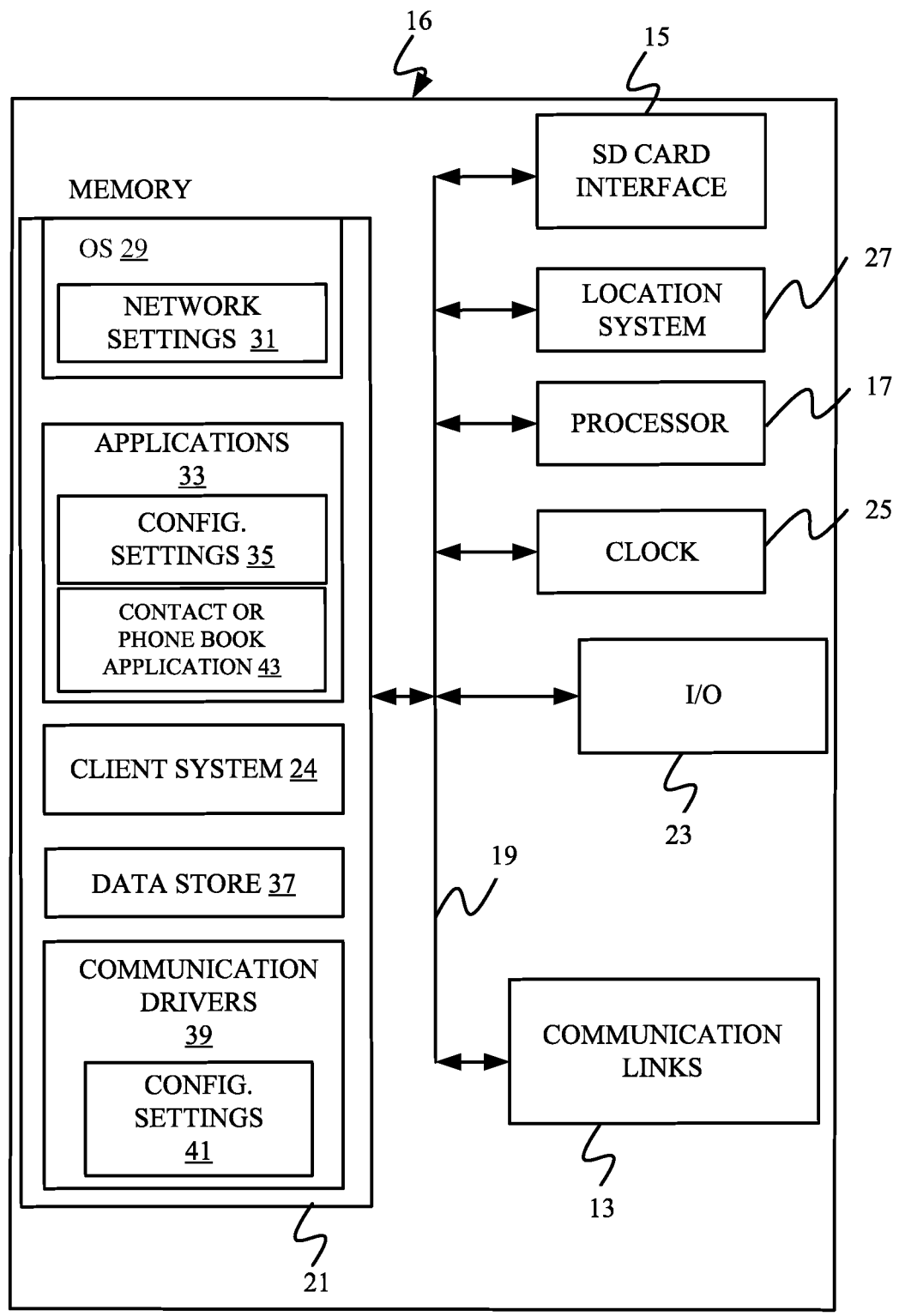
FIGS. 9-11 show examples of mobile devices that can be used in the architectures shown in the previous figures.
Figure 10:
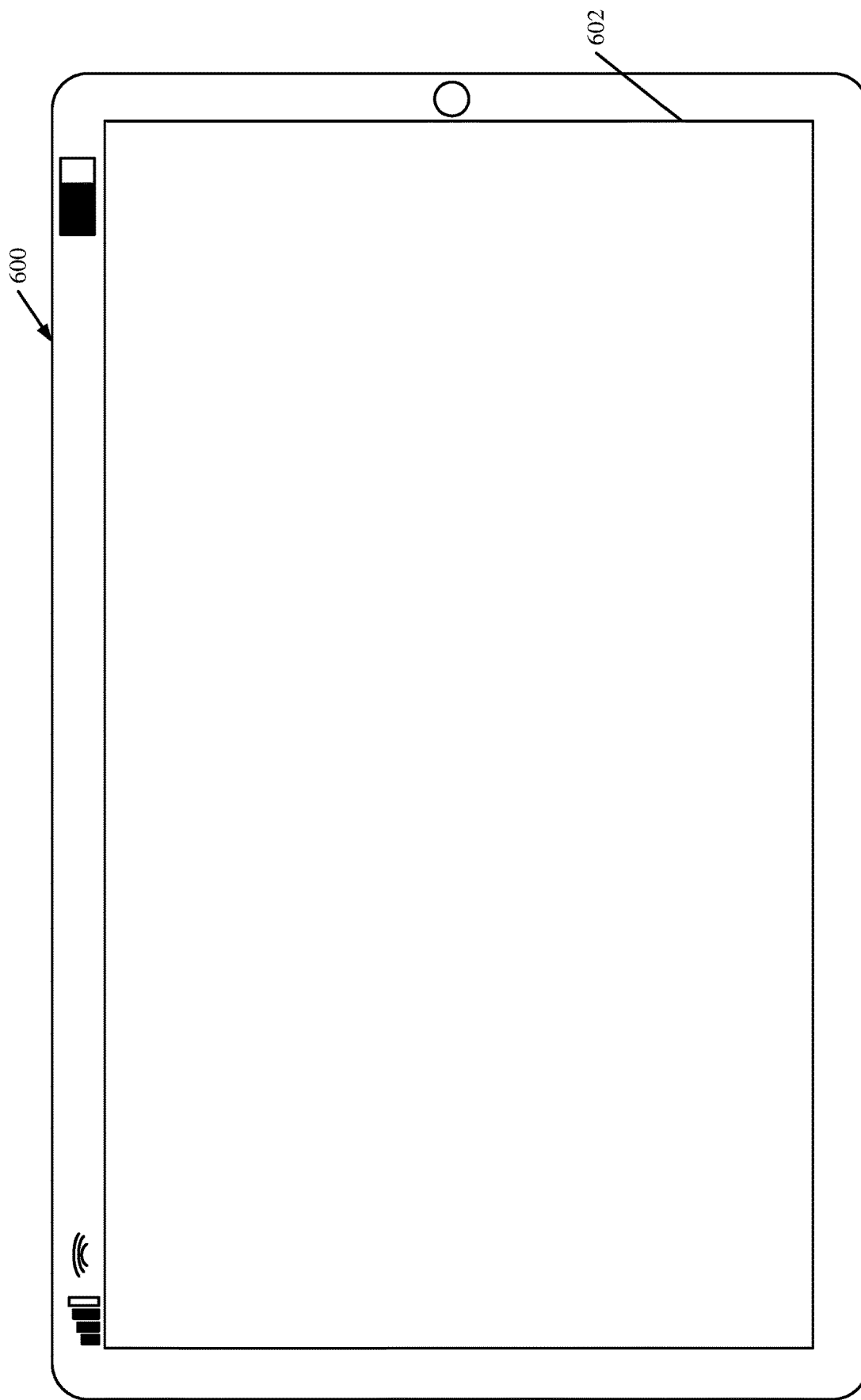
Figure 11:
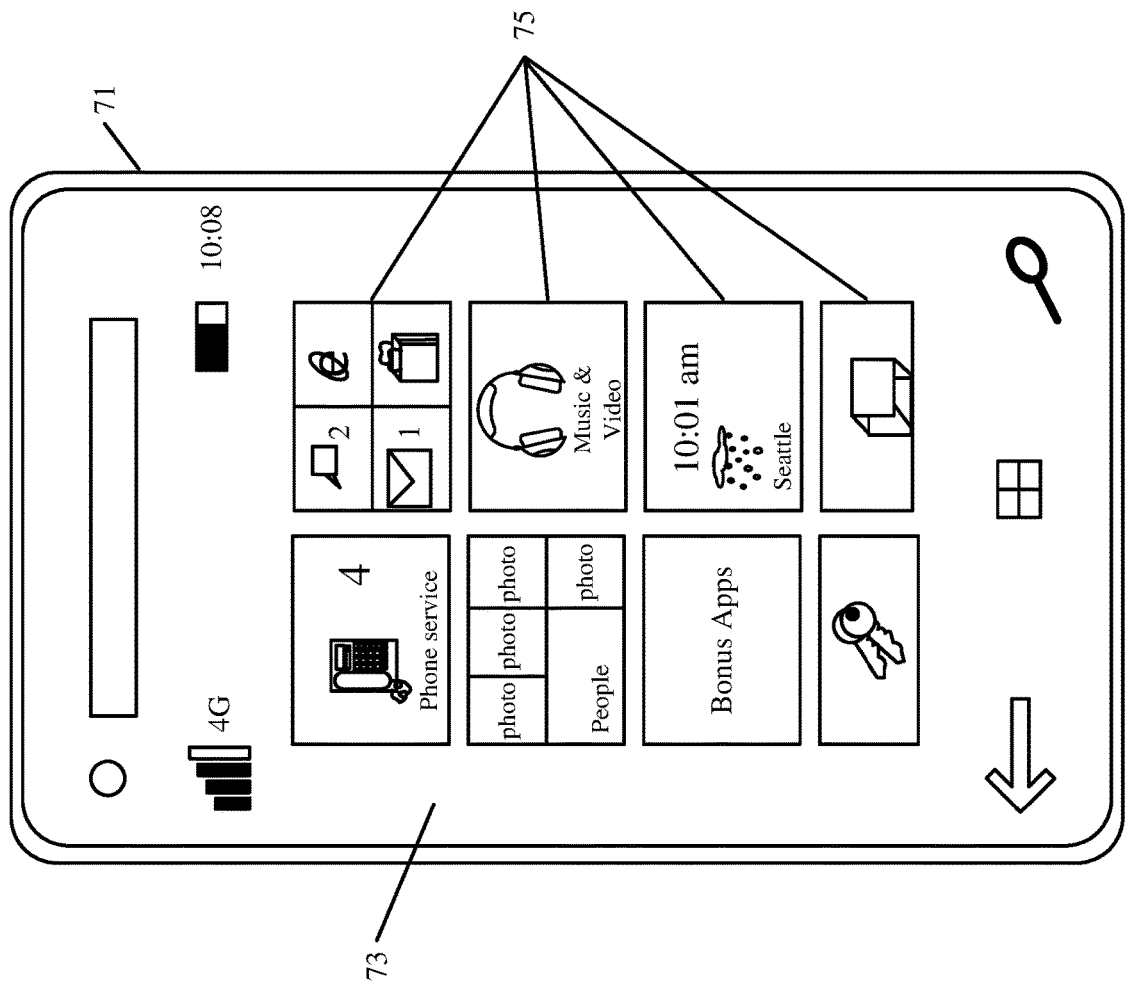

FIG. 9 is a simplified block diagram of one illustrative example of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components computing system 102 or user device 504 or system 116 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one example in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
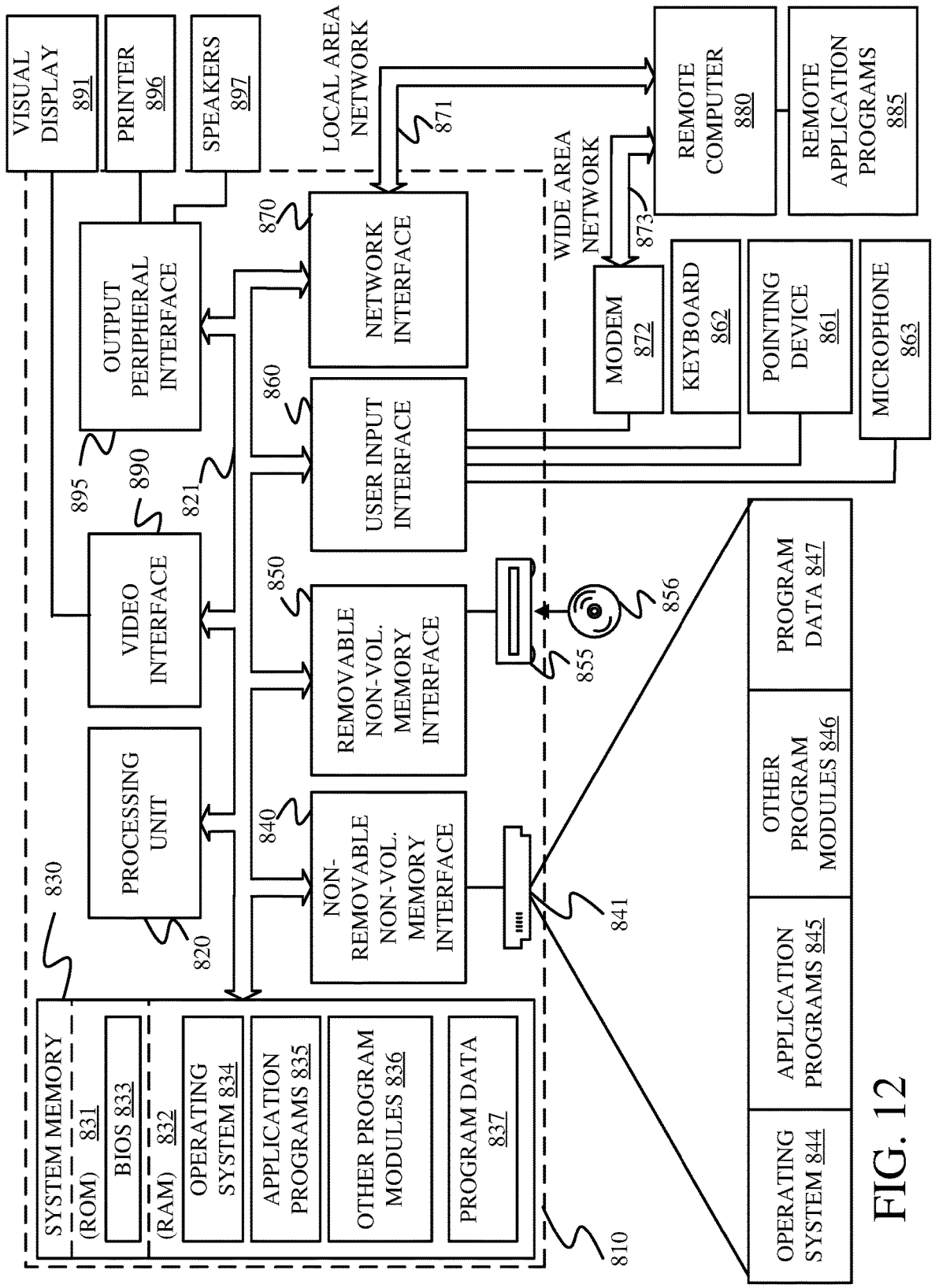
FIG. 12 is a block diagram showing one example of a computing environment that can be used in the architectures shown in the previous figures.

FIG. 12 is one example of a computing environment in which architecture 100, or parts of it, (for example) can be deployed. With reference to FIG. 10, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a processor;

message parsing logic that parses an online chat message received at the computing system to determine whether the online chat message includes an action identifier and, if so, to identifies the action identifier;

mapping accessing logic that accesses an action-to-code mapping to identify executable recovery code based on the action identifier, and recovery code execution logic that executes the identified executable recovery code on the computing system.

Example 2 is the computing system of any or all previous examples and further comprising:

a user interface system configured to generate a chat message display showing a description corresponding to the identified executable recovery code.

Example 3 is the computing system of any or all previous examples and further comprising:

action authorization logic configured to generate an authorization actuator, along with the description on the chat message display, corresponding to the identified executable recovery code and that is user-actuatable to generate a recovery code authorization signal.

Example 4 is the computing system of any or all previous examples and further comprising:

feedback logic configured to generate a feedback chat message display for user interaction to provide feedback indicative of whether executing the identified executable recovery code mitigated an issue encountered on the computing system.

Example 5 is the computing system of any or all previous examples and further comprising:

feedback user interface logic configured to generate, on the feedback chat message display, a feedback actuator, actuatable to indicate the feedback, and to detect user interaction with the feedback actuator and generate a feedback indication indicative of the user interaction Example 6 is the computing system of any or all previous examples wherein the online chat message is received from a support computing system and wherein the feedback logic generates and sends a feedback chat message to the support computing system based on the feedback indication.

Example 7 is the computing system of any or all previous examples wherein the recovery code execution logic generates execution results of executing the executable recovery code.

Example 8 is the computing system of any or all previous examples and further comprising:

upload authorization logic configured to generate an upload authorization chat message display, indicative of the results of executing the executable recovery code and indicating that the results are to be uploaded to the support computing system.

Example 9 is the computing system of any or all previous examples wherein the upload authorization logic is configured to generate an upload authorization actuator on the upload authorization chat message display and detect user interaction with the upload authorization actuator.

Example 10 is the computing system of any or all previous examples and further comprising chat functionality which, based on user actuation of the upload authorization actuator, sends an indication of the results, in a results chat message, to the support computing system.

Example 11 is a computer implemented method, comprising:

receiving an online chat message from a support computing system;

parsing the online chat message received at the computing system to determine whether the online chat message includes an action identifier;

if so, identifying the action identifier;

accessing an action-to-code mapping to identify executable recovery code based on the action identifier; and executing the identified executable recovery code on the computing system.

Example 12 is the computer implemented method of any or all previous examples and further comprising:

generating a chat message display showing a description corresponding to the identified executable recovery code.

Example 13 is the computer implemented method of any or all previous examples and further comprising:

generating an authorization actuator, along with the description on the chat message display, corresponding to the identified executable recovery code and that is user-actuatable to generate a recovery code authorization signal.

Example 14 is the computer implemented method of any or all previous examples and further comprising:

generating a feedback chat message display for user interaction to provide feedback indicative of whether executing the identified executable recovery code mitigated an issue encountered on the computing system.

Example 15 is the computer implemented method of any or all previous examples wherein the online chat message is received from a support computing system, and further comprising:

generating, on the feedback chat message display, a feedback actuator, actuatable to indicate the feedback;

detecting user interaction with the feedback actuator;

generating a feedback indication indicative of the user interaction;

generating a responsive feedback chat message based on the feedback indication; and sending the responsive feedback chat message to the support computing system.

Example 16 is the computer implemented method of any or all previous examples and further comprising:

generating execution results of executing the executable recovery code.

Example 17 is the computer implemented method of any or all previous examples and further comprising:

generating an upload authorization chat message display, indicative of the results of executing the executable recovery code; and indicating that the results are to be uploaded to the support computing system.

Example 18 is the computer implemented method of any or all previous examples and further comprising:

generating an upload authorization actuator on the upload authorization chat message display; and detecting user interaction with the upload authorization actuator.

Example 19 is the computer implemented method of any or all previous examples and further comprising:

based on user actuation of the upload authorization actuator, sending an indication of the results, in a results chat message, to the support computing system.

Example 20 is a computing system, comprising:

a processor;

a plurality of different sets of executable code, stored on the computing system;

a plurality of action-to-code mappings that map each of a plurality of different action identifiers to a different set of executable code;

message parsing logic that parses an online chat message received at the computing system to determine whether the online chat message includes one action identifier, of the plurality of different action identifiers, and, if so, to identifies the one action identifier;

mapping accessing logic that accesses an action-to-code mapping to identify one set of executable code of the plurality of sets of executable code based on the one action identifier, and code execution logic that executes the one set of executable code on the computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, cause the computing system to:
receive an online chat message from a remote system, that is remote from the computing system, over a communication network;
parse the online chat message received at the computing system;
determine, based on parsing the online chat message, that the online chat message includes an action identifier;
identify the action identifier based on the determination;
access an action-to-code mapping that maps the action identifier to executable recovery code; and
execute the executable recovery code on the computing system.

2. The computing system of claim 1 wherein the instructions cause the computing system to:
generate a chat message display showing a description corresponding to the identified executable recovery code.

3. The computing system of claim 2 wherein the instructions cause the computing system to:
generate an authorization actuator, along with the description on the chat message display, corresponding to the identified executable recovery code and that is user-actuatable to generate a recovery code authorization signal.

4. The computing system of claim 3 wherein the instructions cause the computing system to:
generate a feedback chat message display; and
based on user interaction with the feedback chat message display, provide feedback indicative of whether executing the identified executable recovery code mitigated an issue encountered on the computing system.

5. The computing system of claim 4 wherein the instructions cause the computing system to:
receive the online chat message from a support computing system;
generate, on the feedback chat message display, a feedback actuator;
based on user interaction with the feedback actuator, generate a feedback indication indicative of the user interaction with the feedback actuator; and send a feedback chat message to the support computing system based on the feedback indication.

6. The computing system of claim 5 wherein the instructions cause the computing system to generate result results of executing the executable recovery code.

7. The computing system of claim 6 wherein the instructions cause the computing system to:
generate an upload authorization chat message display, indicative of the results of executing the executable recovery code and indicating that the results are to be uploaded to the support computing system.

8. The computing system of claim 7, wherein the instructions cause the computing system to:
provide chat functionality which, based on user actuation of the upload authorization actuator, sends an indication of the results, in a results chat message, to the support computing system; and
generate an upload authorization actuator on the upload authorization chat message display and detect user interaction with the upload authorization actuator.

9. The computing system of claim 1 wherein
the computing system comprises a client computing device having a data store, and
the data store stores at least one of:
the action-to-code mapping, or
the executable recovery code.

10. The computing system of claim 1, wherein
the computing system comprises a client computing device,
the remote system comprises a support computing system,
the communication network comprises a wide area network, and
the instructions cause the client computing device to:
generate a chat message interface having chat functionality configured to provide online chat messages between a client user of the client computing device and a support user of the support computing system over the wide area network; and
receive user input from the client user, through the chat message interface.

11. A method performed by a client computing system, the method comprising:
receiving, by the client computing system, an online chat message from a support computing system over a wide area communication network;
parsing the online chat message to determine whether the online chat message includes an action identifier;
accessing an action-to-code mapping to identify executable recovery code based on the action identifier; and
executing the identified executable recovery code on the client computing system.

12. The method of claim 11 and further comprising:
generating a chat message display showing a description corresponding to the identified executable recovery code.

13. The method of claim 12 and further comprising:
generating an authorization actuator, along with the description on the chat message display, corresponding to the identified executable recovery code and that is user-actuatable to generate a recovery code authorization signal.

14. The method of claim 13 and further comprising:
generating a feedback chat message display for user interaction to provide feedback indicative of whether executing the identified executable recovery code mitigated an issue encountered on the client computing system.

15. The method of claim 14, and further comprising:

generating, on the feedback chat message display, a feedback actuator, actuatable to indicate the feedback;

detecting user interaction with the feedback actuator;

generating a feedback indication indicative of the user interaction;

generating a responsive feedback chat message based on the feedback indication; and sending the responsive feedback chat message to the support computing system.

16. The method of claim 15 and further comprising:

generating results of executing the executable recovery code.

17. The method of claim 16 and further comprising:

generating an upload authorization chat message display, indicative of the results of executing the executable recovery code; and indicating that the results are to be uploaded to the support computing system.

18. The method of claim 17 and further comprising:

generating an upload authorization actuator on the upload authorization chat message display; and detecting user interaction with the upload authorization actuator.

19. The method of claim 18 and further comprising:

based on user actuation of the upload authorization actuator, sending an indication of the results, in a results chat message, to the support computing system.

20. A computing system, comprising:

a processor; and memory storing instructions executable by the processor, wherein the instructions when executed, cause the computing system to:

store a plurality of different sets of executable code on the computing system;

provide a plurality of action-to-code mappings that map each of a plurality of different action identifiers to a different set of executable code;

parse an online chat message received at the computing system to determine that the online chat message includes one action identifier, of the plurality of different action identifiers;

identify, based on the determination, the one action identifier;

access an action-to-code mapping to identify one set of executable code of the plurality of different sets of executable code based on the one action identifier; and execute the one set of executable code on the computing system.

* * * * *